United States Patent

[11] 3,599,894

[72] Inventor Evan A. Edwards
 Rochester, N.Y.
[21] Appl. No. 838,275
[22] Filed July 1, 1969
[45] Patented Aug. 17, 1971
[73] Assignee Eastman Kodak Company
 Rochester, N.Y.

[54] ANTIBACKUP MECHANISM IN A FILM CARTRIDGE, AND MEANS IN A CAMERA FOR DISABLING THE MECHANISM
 5 Claims, 4 Drawing Figs.

[52] U.S. Cl. ................................................. 242/194,
 242/71.2, 242/198, 352/72, 352/156
[51] Int. Cl. ................................................. G03b 1/04
[50] Field of Search ............................................. 242/71.1,
 198, 193, 194; 352/72–78, 156

[56] References Cited
 UNITED STATES PATENTS
 3,208,686 9/1965 Edwards et al. ............... 242/71.2
 3,415,599 12/1968 Winkler et al. ................ 352/78
 FOREIGN PATENTS
 6,916,866 4/1969 Germany ....................... 242/197
 OTHER REFERENCES
 ROS - Note: Regarding Germany Gmb cited above, This Reference furnished by Applicant as submitted citation. No copies for Applicant needed.

Primary Examiner—Leonard D. Christian
Attorneys—Robert W. Hampton and William F. Delaney, Jr.

ABSTRACT: An antibackup mechanism for preventing reverse rotation of the takeup spool in a movie film cartridge, and means for disabling the antibackup mechanism in a camera adapted for driving the film in reverse for photographing "fade, lap and dissolve" sequences. In a preferred embodiment the mechanism is a ratchet coupling between the spool and the cartridge housing, comprising a first member mounted in the cartridge for movement transverse to the axis of rotation of the spool, and a second member slidably mounted on the spool for rotation therewith and for axial movement between a first position in which the members cooperate to prevent rotation of the spool in one direction and permit rotation of the spool in the opposite direction for winding up film, and a second position in which the members are disabled. The second member slidably mounted on the spool has a cup-shaped portion defining a cylindrical bore that slidably fits over a cylindrical projection on the spool to assure correct alignment of the slide member with respect to the spool, particularly when the slide member is being moved axially. The antibackup mechanism includes means for biasing the slide member toward the first position, and the camera according to the preferred embodiment of the invention is provided with a projecting member that engages the cup-shaped portion of the slide member to depress it against the bias to its disabled position.

PATENTED AUG 17 1971 3,599,894
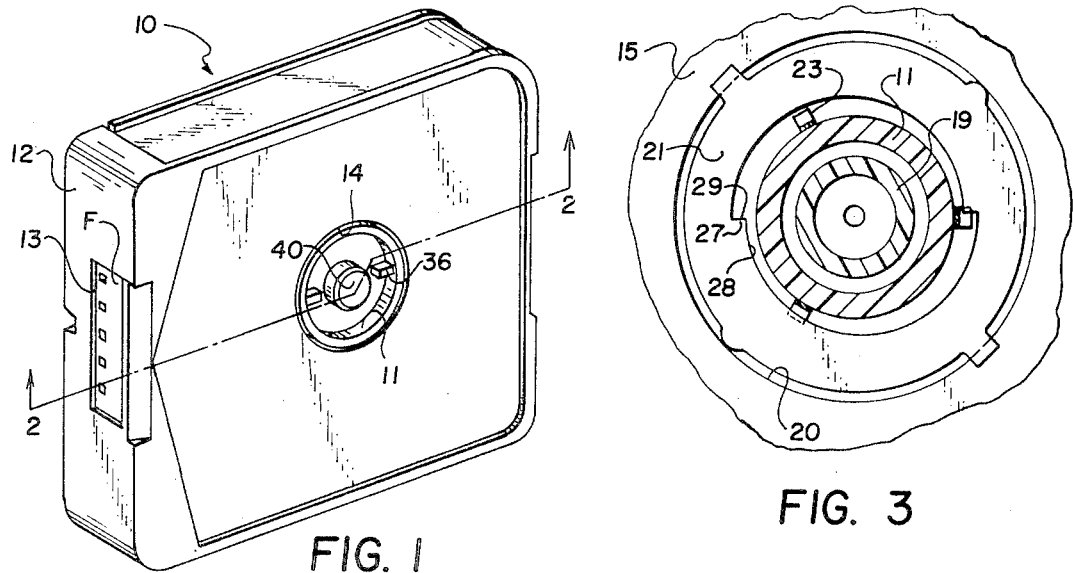
FIG. 1
FIG. 3
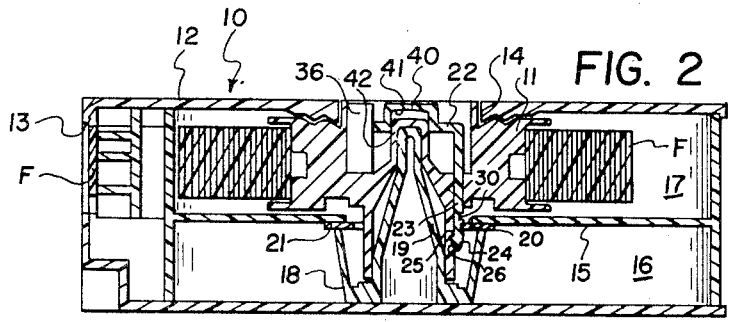
FIG. 2
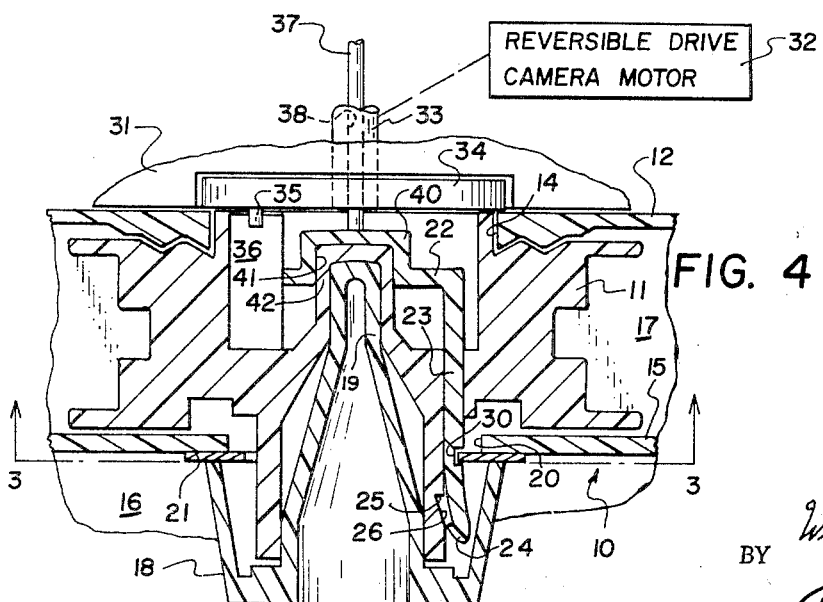
FIG. 4
EVAN A. EDWARDS
INVENTOR.
BY William F. Delaney Jr.
Robert W. Hampton
ATTORNEYS

ANTIBACKUP MECHANISM IN A FILM CARTRIDGE, AND MEANS IN A CAMERA FOR DISABLING THE MECHANISM

CROSS-REFERENCE TO RELATED APPLICATION

Reference is made to commonly assigned, copending U.S. Pat. application Ser. No. 838,276, entitled "An Antibackup Mechanism for the Takeup Spool in a Film Cartridge," filed July 1, 1969 in the names of E. A. Edwards and R. C. Sutliff.

BACKGROUND OF THE INVENTION

The present invention relates to film cartridges in which a roll of film is sealed before, during and after exposure in a camera, and to cameras adapted to receive such cartridges. More particularly this invention relates to such cartridges having a disengageable antibackup mechanism for the takeup spool, and to cameras adapted to disengage the antibackup mechanism for driving the film in reverse to photograph overlapping "fade, lap and dissolve" sequences.

Many commercially available movie camera cartridges include a substantially rectangular housing in which a supply roll of film and a takeup spool are rotatably mounted in a side-by-side coaxial relation, such as disclosed for example in U.S. Pat. No. 3,208,686 issued Sept. 28, 1965 in the name of E. A. Edwards et al. As initially loaded, a film leader is pulled from the supply roll, threaded past an exposure aperture in an end wall of the cartridge and then attached to the takeup spool. After being so loaded with unexposed film, the housing is closed and sealed by one or more covers.

When the film in such a cartridge is to be exposed, the cartridge is placed in motion picture camera adapted to accommodate the cartridge, and a film advancing mechanism in the camera engages perforations in the film driving operation of the camera to intermittently pull film from the supply coil and transport it past the exposure aperture to the takeup spool. A takeup drive in the camera is coupled to the takeup spool of the cartridge to positively drive the spool to wind up the exposed film.

Usually such cartridges include devices to overcome the tendency of coiled film to clockspring when the cartridge is subjected to sharp movements. The term "clockspring," as used herein, means radial displacement of successive outer convolutions of a film roll, caused by the tendency of the roll to unwind. Anticlockspring devices in the takeup chamber of most commercial cartridges operate on the takeup spool in such a manner that reverse rotation of the spool is prevented, so that film on the spool cannot be unwound. Such devices often comprise a ratchet arrangement wherein a shuttle with a plurality of teeth engages teeth on the spool to prevent rotation of the spool in one direction. However, such devices prevent the film from being driven in a reverse direction for photographing double exposure "fade, lap and dissolve" sequences or for removal of the exposed film through the exposure aperture of the cartridge.

To produce "fade, lap and dissolve" sequences with presently available commercial cartridges, some cameras have been provided with a feature permitting the operator to advance a predetermined number of frames of film past the exposure aperture, during which the exposure aperture is gradually reduced and the takeup drive in the camera is stopped. The film thus exposed is collected loosely in the takeup chamber, and the camera can then be driven in reverse to enable the operator to make a second sequence of exposures on the previously exposed film with the exposure aperture gradually increased to obtain a "fade, lap and dissolve" sequence. The difficulty with such an arrangement is that it requires space within the takeup chamber to receive film without winding it up. Yet, when almost all of a roll of film has been exposed, there is very little space remaining in the takeup chamber to receive the unwound film, so that an attempt to produce a "fade, lap and dissolve" sequence near the end of the roll will frequently cause the film to jam in the cartridge. Accordingly, it is preferred to wind exposed film onto the takeup spool and then to disable the antibackup mechanism and drive the film in reverse for taking an overlapping "fade, lap and dissolve" sequence.

Such an antibackup mechanism would also permit easier unloading of exposed film from the cartridge, since the exposed film could be unwound from the takeup spool and removed through the exposure aperture without breaking the cartridge open.

It is known in the prior art to provide film cartridges with antibackup devices, which prevent reverse rotation of the takeup spool, and which can be disabled without opening the cartridge. The antibackup device in one such cartridge comprises a slide member mounted on the spool for engaging the antibackup shuttle in one position to prevent reverse rotation of the spool, and the slide can be depressed to a second position in which the mechanism is disabled. However, in such a cartridge the slide member is biased toward the shuttle-engaging position by a coil spring mounted between the spool and the slide member, and the manufacturing tolerance of the resilient force provided by such a spring must be carefully predetermined and maintained to assure proper operation of the slide member, particularly when it is being depressed from the exterior of the cartridge against the spring bias. Moreover, the slide member in such a cartridge is depressed in a camera by engagement with the camera drive lug, which increases the wear and strain on the drive mechanism in the camera.

SUMMARY OF THE INVENTION

It is an object of this invention to provide a film cartridge having an improved antibackup mechanism of the type described above that can be disabled without opening the cartridge; and to provide improved means in a camera for disabling the antibackup mechanism of such a cartridge when it is placed in the camera to permit photographing "fade, lap and dissolve" sequences.

According to this invention a film cartridge having a takeup spool rotatably mounted in a takeup chamber is provided with an antibackup mechanism comprising a first member mounted in the cartridge for movement transverse to the axis of rotation of the spool, and a second member mounted on the spool for rotation therewith and for movement between a first position in which the members cooperate to prevent rotation of the spool in one direction and permit rotation of the spool in the opposite direction for winding up film, and a second position in which the members are disabled. The second member has a portion which can be engaged from the exterior of the cartridge, and a detent portion biased radially toward engagement with a notch defined by the spool to releasably retain the second member in one of its positions. The notch in the spool has an inclined surface that is engageable by the detent to urge the second member toward that retained position when the second member is in its other position.

According to the preferred embodiment of the invention, the portion of the slide member that is engageable from the exterior of the cartridge includes a cup-shaped portion defining a cylindrical bore that slidably fits over a cylindrical projection on the spool. This slidable fit functions as a bearing that assures correct alignment between the slide member and the spool when the slide member is being moved axially from one position to another. The cup-shaped portion of the slide member is particularly easily accessible to a cooperating projection according to the invention in a camera having a reversible drive for "fade, lap and dissolve" operation. The projection extends along the axis of rotation of the spool of a cartridge loaded in the camera. Preferably the projection is mounted on the camera independently of the drive plate and drive lug of camera.

BRIEF DESCRIPTION OF THE DRAWINGS

FIG. 1 is a perspective view of a cartridge according to the invention showing the takeup side of the cartridge, and portions of the takeup spool and antibackup mechanism according to the present invention;

FIG. 2 is a cross-sectional view of the cartridge shown in FIG. 1 taken along the lines 2–2;

FIG. 3 is a cross-sectional view of the cartridge shown in FIG. 1 taken along the lines 3–3 showing a plane view of one member of the antibackup mechanism according to the invention; and FIG. 4 is a cross-sectional view of a portion of the cartridge, similar to FIG. 2, but with the antibackup device disabled by a projection on a camera according to the invention.

DETAILED DESCRIPTION OF THE DRAWINGS

As shown in the drawings, a film cartridge 10 according to a preferred embodiment of this invention is shown having an antibackup mechanism for the takeup spool, which can be disengaged from the exterior of the cartridge. In FIG. 1 the cartridge 10 is shown having a rectangular housing 12, an exposure aperture 13, and an aperture 14 through which the takeup spool 11 is engageable from the exterior of the cartridge housing 12.

As seen in FIG. 2 the cartridge 10 includes an internal partition 15 which divides the housing 12 into a supply chamber 16 and a takeup chamber 17. Located in the supply chamber 16 is a hub 18 mounted on the partition 15 for locating a supply roll of film (not shown). Mounted on the inside of the hub 18 is a post 19 extending through an aperture 20 in the partition 15 and into the takeup chamber 17. The takeup spool 11 is mounted for rotation on the post 19 for receiving and winding up exposed film F. As initially loaded, a film leader is pulled from the supply roll, threaded past the exposure aperture 13 and guided through a film path to the takeup chamber 17 where the lead end of the film is attached to the takeup spool 11.

To prevent film wound on the takeup spool from clockspringing, the cartridge 10 includes an antibackup mechanism, which in the disclosed embodiment is a ratchet comprising a shuttle member 21 mounted in the cartridge for movement transverse to the axis of rotation of the spool, and a slide member 22 mounted on the spool for rotation therewith and for axial movement with respect to the shuttle 21. The slide member 22 has one or more fingers 23 extending parallel to the axis of rotation of the spool. Each finger 23 has a detent 24 that is engageable within a notch 25 defined by the spool 11. The notch 25 has a ramp surface 26 inclined with respect to the axis of rotation of the spool.

As seen more clearly in FIG. 3 the shuttle 21 has inwardly extending teeth 27 which are engageable with the fingers 23 of the slide member 22. The teeth 27 define gradually inclined surfaces 28 and sharply inclined surfaces 29, such that rotation of the takeup spool in a clockwise direction as viewed from the takeup side of the cartridge will cause the shuttle 21 to oscillate transversely to the axis of rotation of the spool with little resistance provided by the gradually inclined surfaces 28 of the teeth 27. However, rotation of the spool in a counterclockwise direction will cause a finger 23 on the slide 22 to engage the sharply inclined surface 29 of one of the teeth 27 on the shuttle so that rotation of the slide member and the spool is prevented in that direction and film cannot be unwound from the spool.

As seen in FIG. 4 the antibackup mechanism of the cartridge 10 can be disabled by depressing the slide member 22 to a position in which a recess 30 in the finger 23 is aligned with the shuttle 21 to enable the spool to be rotated in a counterclockwise direction without interference with the shuttle. When the slide member 22 is depressed, the detent 24 on the finger 23 rides outwardly on the ramp 26 of the notch 25 and flexes the finger 23 radially outwardly. The resiliency of the finger 23 biases the detent radially inwardly against the ramp, and thereby biases the detent 24 into the notch 25 to urge the slide member into a raised position in which the antibackup mechanism is operative. When the slide member is in its raised position the resiliency of the finger 23 releasably retains the detent 24 in the notch 25 to hold the slide member in that position.

The slide member 22 according to the preferred embodiment of the invention includes a cup-shaped portion 40, engageable from the exterior of the cartridge and defining an interior bore 41 that slidably fits on a cylindrical projection 42 on the spool 11. This cup-shaped portion permits the slide member to be depressed by a member engaging it on the axis of rotation which reduces the friction between the members and reduces the force required to turn the spool when the slide member is depressed. The sliding engagement of the projection 42 of the spool in the bore 41 of the cup-shaped portion also insures a proper alignment of the slide member with respect to the spool, which is particularly important when the cartridge is being inserted in the camera or when the slide member is being depressed.

A camera mechanism according to the invention for depressing the slide member of such a cartridge operatively positioned in the camera is shown at FIG. 4 with the antibackup mechanism disabled to enable an operator to photograph overlapping "fade, lap and dissolve" sequences. Such a camera, a portion of which is indicated at 31, would include a reversible drive motor 32, and an exposure control system (not shown) for gradually varying exposure conditions during a "fade, lap and dissolve" sequence. Such a reversible motor and exposure control system are well known in the art and need not be described in detail herein.

The motor 32 drives a reversible pulldown claw (not shown) and a shaft 33 to which a rotatable driving plate 34 is attached. When the cartridge is loaded in the camera, the spool 11 is positioned with its axis of rotation substantially aligned with the axis of rotation of the shaft 33 and plate 34. A drive lug 35 on the plate 34 extends toward the spool and is offset from the axis of rotation of the plate to drivingly engage either side of a drive lug 36 on the spool to drive the spool in either direction. The slide member 22 is shown depressed by a pin 37 which extends through an axial bore 38 in the shaft 33. The pin 37 could be mounted on the shaft 33 or on plate 34, but in most commercially available movie cameras the drive plate is biased axially toward the spool to assure engagement of the drive lugs 35 and 36. The cup-shaped portion 40 of the slide member 22 enables the slide to be depressed by a camera projection mounted independently of the bias on the drive plate 34 and permits the slide to be depressed to any desired depth without requiring the drive lug 35 to be extended. A further advantage of the camera mechanism shown in FIG. 4 is that the slide member 22 is depressed by engagement of pin 37 along the axis of rotation of the slide and spool. This arrangement reduces friction and avoids the application of additional stress on the plate 34 and lug 35, and consequently wear and strain on these and other drive parts is reduced. In a camera which is not provided with a reverse drive, the drive plate 34 would not be provided with a pin or detent 37, and the slide member 22 would remain in a raised position in which the antibackup mechanism would be operative to prevent reverse rotation of the spool.

The invention has been described in detail with particular reference to preferred embodiments thereof, but it will be understood that variations and modifications can be effected within the spirit and scope of the invention.

I claim:

1. In a motion picture film cartridge having a housing defining an exposure aperture, means defining a takeup chamber within the housing, and means for guiding film past the exposure aperture to the takeup chamber, the combination comprising:
   a takeup spool rotatably mounted in the takeup chamber;
   a first member mounted in the cartridge for movement transverse to the axis of rotation of the spool; and
   a second member mounted on the spool for rotation therewith and for axial movement between a first position in which said members cooperate to prevent rotation of the spool in one direction and to permit rotation of the spool in the opposite direction for winding up film and a second position in which said members are disabled, said second member having a projection extending substantially along the axis of rotation of the spool and engageable from the exterior of the cartridge for movement between said first and second positions.

2. In a motion picture film cartridge having a housing defining an exposure aperture, means defining a takeup chamber within the housing, and means for guiding film past the exposure aperture to the takeup chamber, the combination comprising:

a takeup spool rotatably mounted in the takeup chamber, said spool having a cylindrical projection extending along the axis of rotation of the spool;

a first member mounted in the cartridge for movement transverse to the axis of rotation of the spool; and a second member mounted on the spool for rotation therewith and for axial movement between a first position in which said members cooperate to prevent rotation of the spool in one direction and to permit rotation of the spool in the opposite direction for winding up film and a second position in which said members are disabled, said second member having a portion defining a cylindrical bore that slidably fits over the cylindrical projection of the spool to align the second member with the axis of the spool.

3. In a motion picture film cartridge having a housing defining an exposure aperture, means defining a takeup chamber within the housing, and means for guiding film past the exposure aperture to the takeup chamber, the combination comprising:

a takeup spool rotatably mounted in the takeup chamber, said spool having a cylindrical projection extending along the axis of rotation of the spool;

a first member mounted in the cartridge for movement transverse to the axis of rotation of the spool; and a second member mounted on the spool for rotation therewith and for axial movement between a first position in which said members cooperate to prevent rotation of the spool in one direction and to permit rotation of the spool in the opposite direction for winding up film and a second position in which said members are disabled, said second member having a cup-shaped portion defining a cylindrical bore that slidably fits over the cylindrical projection of the spool to align the second member with the axis of the spool and defining a projection engageable from the exterior of the cartridge.

4. A motion picture camera adapted to receive a film cartridge, said cartridge including a takeup spool rotatably mounted in the cartridge with a drive lug offset from the axis of rotation of the spool and engageable from the exterior of the cartridge for winding up exposed film, and an antibackup mechanism including a member mounted on the spool for rotation therewith and for axial movement between a first position in which the antibackup mechanism prevents rotation of the spool in one direction and permits rotation of the spool in the opposite direction for winding up film and a second position in which the antibackup mechanism is disabled, said member of said antibackup mechanism defining a projection extending substantially along the axis of rotation of the spool and engageable from the exterior of the cartridge, said motion picture camera comprising:

a reversible drive motor;

a rotatable drive plate drivingly engaged with the drive motor;

a drive lug on the drive plate offset from the axis of rotation of the drive plate to drivingly engage the drive lug on the spool when the cartridge is loaded in the camera; and a projection extending along the axis of rotation of the drive plate for engaging the projection to move the member of the antibackup mechanism of the cartridge to its second position in which the antibackup mechanism of the cartridge is disabled.

5. In combination a motion picture film cartridge and a motion picture camera adapted to receive the cartridge and drive film through the cartridge in a forward or reverse direction, said film cartridge comprising:

a takeup spool rotatably mounted in the cartridge and having a drive lug engageable from the exterior of the cartridge, and an antibackup mechanism including a member mounted on the spool for rotation therewith and for axial movement between a first position in which said mechanism prevents rotation of the spool in one direction and permits rotation of the spool in the opposite direction and a second position in which said mechanism is disabled, said member having a projection extending along the axis of rotation of the spool, and engageable from the exterior of the cartridge, said camera comprising:

a reversible drive motor;

a rotatable drive shaft drivingly engaged with said motor, said shaft having a bore extending along its axis;

a rotatable drive plate connected to said shaft for rotation therewith, said plate having a drive lug offset from the axis of rotation of the plate for engaging the drive lug on the spool; and a pin mounted on said camera independently of said shaft and said plate extending through said bore to engage said projection and move said member of said antibackup mechanism to its second position in which said antibackup mechanism is disabled.